United States Patent
Inoue et al.

(10) Patent No.: US 7,464,210 B2
(45) Date of Patent: Dec. 9, 2008

(54) DATA PROCESSING SYSTEM HAVING A DATA TRANSFER UNIT FOR CONVERTING AN INTEGER INTO A FLOATING-POINT NUMBER WHEN TRANFERRING DATA FROM A PERIPHERAL CIRCUIT TO A MEMORY

(75) Inventors: Masafumi Inoue, Tokyo (JP); Takanaga Yamazaki, Tama (JP); Takeshi Kataoka, Tokyo (JP); Hideo Kubota, Higashi-murayama (JP); Satoshi Tanaka, Tachikawa (JP); Hirokazu Komori, Okazaki (JP); Takahiro Gotoh, Ichinomiya (JP)

(73) Assignees: Renesas Technology Corp., Tokyo (JP); Denso Corporation, Aichi (JP)

( * ) Notice: Subject to any disclaimer, the term of this patent is extended or adjusted under 35 U.S.C. 154(b) by 0 days.

(21) Appl. No.: 11/037,092

(22) Filed: Jan. 19, 2005

(65) Prior Publication Data
US 2005/0193156 A1  Sep. 1, 2005

(30) Foreign Application Priority Data
Feb. 27, 2004  (JP) ............................. 2004-053421

(51) Int. Cl.
*G06F 13/24* (2006.01)
(52) U.S. Cl. ...................................... 710/263; 710/267
(58) Field of Classification Search ......... 710/260–269, 710/32–34, 48–49, 58–60
See application file for complete search history.

(56) References Cited

U.S. PATENT DOCUMENTS

| | | | | |
|---|---|---|---|---|
| 5,410,715 A | * | 4/1995 | Ishimoto et al. | 710/264 |
| 5,542,076 A | * | 7/1996 | Benson et al. | 710/260 |
| 5,708,814 A | * | 1/1998 | Short et al. | 710/260 |
| 5,748,855 A | * | 5/1998 | Levine et al. | 712/23 |
| 6,240,483 B1 | * | 5/2001 | Gutta et al. | 710/260 |
| 6,256,699 B1 | * | 7/2001 | Lee | 710/310 |
| 6,615,305 B1 | * | 9/2003 | Olesen et al. | 710/262 |

(Continued)

FOREIGN PATENT DOCUMENTS

JP  8-314731  5/1995

OTHER PUBLICATIONS

"Interrupt handler" Wikipedia, http://en.wikipedia.org/wiki/Interrupt_handler.

*Primary Examiner*—Raymond N Phan
(74) *Attorney, Agent, or Firm*—Reed Smith LLP; Stanley P. Fisher, Esq.; Juan Carlos A. Marquez, Esq.

(57) ABSTRACT

This invention provides a data processing system capable of performing an interrupt exception handling routine as many times as the number of times of occurrence of a request event for the same interrupt exception handling routine if the request event occurs a plurality of times. A software interrupt counter or a hardware interrupt counter for retaining the number of times of occurrence of an interrupt request generation event counts up when a software processing which generates a software interrupt or a hardware event that generates a hardware interrupt occurs, and counts down when a CPU performs a processing for removing the interrupt request. If the value of the software interrupt counter and the value of the hardware interrupt counter are not zero, a software interrupt request signal and a hardware interrupt request signal to the CPU are asserted.

16 Claims, 13 Drawing Sheets

U.S. PATENT DOCUMENTS

| | | | |
|---|---|---|---|
| 6,708,296 B1 * | 3/2004 | Gover et al. | 714/47 |
| 6,754,754 B1 * | 6/2004 | Quach et al. | 710/260 |
| 6,845,419 B1 * | 1/2005 | Moyer | 710/264 |
| 6,988,156 B2 * | 1/2006 | Musumeci | 710/260 |
| 7,257,658 B2 * | 8/2007 | Winkler et al. | 710/266 |
| 2003/0074508 A1 * | 4/2003 | Uhler | 710/260 |

* cited by examiner

US 7,464,210 B2

DATA PROCESSING SYSTEM HAVING A DATA TRANSFER UNIT FOR CONVERTING AN INTEGER INTO A FLOATING-POINT NUMBER WHEN TRANFERRING DATA FROM A PERIPHERAL CIRCUIT TO A MEMORY

CROSS-REFERENCE TO RELATED APPLICATION

The present application claims priority from Japanese Patent Application JP 2004-053421 filed on Feb. 27, 2004, the content of which is hereby incorporated by reference into this application.

TECHNICAL FIELD OF THE INVENTION

The present invention relates to a data processing system. More specifically, the present invention relates to a technique which is effective when applied to the configuration of an interrupt control section of the data processing system.

BACKGROUND OF THE INVENTION

As the techniques related to the data processing system that the inventors of the present invention have examined, for example, the following techniques are known.

As means for allowing a central processing unit (hereinafter, "CPU") to execute another task while the CPU is executing a certain instruction (task), a software interrupt and a hardware interrupt are available.

The software interrupt is as follows. If the CPU performs a specific software processing for generating an interrupt (instruction execution), then an interrupt request flag present in an interrupt controller is set on, an interrupt request signal from the interrupt controller to the CPU is asserted (made active (effective)), and the CPU thereby starts executing an interrupt exception handling routine (another task). If the CPU performs a processing for removing the interrupt request (instruction execution) when finishing the execution of the instruction of the interrupt exception handling routine, then the interrupt request flag present in the interrupt controller is cleared, and the interrupt request signal from the interrupt controller to the CPU is negated (made inactive (ineffective)). Then, if the CPU executes a return instruction from the interrupt exception processing, the CPU returns to the instruction execution before the execution of the interrupt exception handling routine.

Examples of the hardware interrupt include a hardware interrupt by an internal peripheral module and a hardware interrupt by an external terminal.

The hardware interrupt by an internal peripheral module is as follows. If some event (e.g., a comparison matching of time module or completion of transmission or reception of a communication module) occurs in an internal peripheral module in the hardware (e.g., a microcontroller), an interrupt request flag present in the corresponding internal peripheral module is set on, an interrupt request signal from the internal peripheral module to the interrupt controller is asserted, and an interrupt request signal from the interrupt controller to the CPU is asserted. The CPU thereby starts executing an interrupt exception handling routine (another task). If the CPU performs a processing for removing the interrupt request (instruction execution) when finishing the execution of the instruction of the interrupt exception handling routine, then the interrupt request flag present in the internal peripheral module is cleared, the interrupt request signal from the internal peripheral module to the interrupt controller is negated, and the interrupt request signal from the interrupt controller to the CPU is negated. Then, if a return instruction from the exception processing is executed, the CPU returns to the instruction execution before the execution of the interrupt exception handling routine.

The hardware interrupt by an external terminal is as follows. If some event (e.g., change in level of an external IRQ terminal) occurs in an external terminal provided in hardware (e.g., a microcontroller), the event is detected and an interrupt request flag present in the interrupt controller is set on. Then, an interrupt request signal from the interrupt controller to the CPU is asserted, and the CPU thereby starts executing the interrupt exception handling routine (another task). If the CPU performs a processing for removing the interrupt request (instruction execution) when finishing the execution of the instruction of the interrupt exception handling routine, the interrupt request flag present in the interrupt controller is cleared and the interrupt request signal from the interrupt controller to the CPU is negated. If a return instruction from the exception processing is executed, the CPU returns to the instruction execution before the execution of the interrupt exception handling routine.

An interrupt processing function is described in, for example, Japanese Patent Application Laid-Open No. 8-314731.

Also, a microcontroller employed for automobile power train control is normally mounted with a floating point unit (hereinafter "FPU"). In the controller of this type, sensor information is converted into digital information by using an analog-digital converter (hereinafter "AD converter"), and a control target is controlled by an arithmetic operation. In the case of analyzing the sensor information changing rapidly, in particular, it is necessary to collect data at a high rate and perform a digital signal processing.

Conventionally, in a method for storing samples used for the digital signal processing such as a knock control, data is transferred from the AD converter to an internal RAM (memory) by using a data transfer processor such as a direct memory access controller (hereinafter, "DMAC") provided in the microcontroller. After the data is transferred, a transferred data value in the internal RAM is read by the CPU and the digital signal processing is thereby carried out.

SUMMARY OF THE INVENTION

The inventors of the present invention have examined these conventional interrupt exception handling (interrupt exception processing) techniques. As a result, the following respects are found out.

In both cases of the software interrupt and the hardware interrupt, the CPU performs the processing for removing the interrupt request (instruction execution) when finishing the execution of the instruction of the interrupt exception handling routine (interrupt exception processing routine). By doing so, the interrupt request flag is cleared and the interrupt request signal is negated. However, if such an event that the same interrupt request is generated occurs again before performing the processing for removing the interrupt request (instruction execution), a conventional interrupt mechanism performs the processing for removing the interrupt request as a part of the first interrupt exception handling routine. Consequently, the interrupt request flag is cleared and the interrupt request signal is negated. Accordingly, after the CPU executes the return instruction from the interrupt exception processing and returns to the instruction execution before the execution of the interrupt exception handling routine, the CPU does not execute the interrupt exception handling routine for a second interrupt request generation event since the interrupt request signal is negated. As a result, the interrupt exception handling routine cannot be executed as many times as the number of times of occurrence of the event that the same interrupt request is generated.

Therefore, an object of the present invention is to provide a data processing system capable of performing an interrupt exception handling routine as many times as the number of times of occurrence of the request event for the same interrupt exception handling routine even if the request event occurs a plurality of times.

Furthermore, the digital signal processing is conventionally carried out by using an integer format. However, it is expected that a more efficient arithmetic operation using floating-point number format will be performed in the future. Also, while the number of data used for the data signal processing is generally and conventionally equal to or smaller than several tens, it is expected that the number of data will increase to several hundreds or more.

Therefore, another object of the present invention is to provide a data processing system capable of efficiently converting sensor information from integers into floating-point numbers if it is necessary to collect data at a high rate and perform the digital signal processing.

The above and other objects and novel characteristics of the present invention will be apparent from the description and the accompanying drawings of this specification.

The typical ones of the inventions disclosed in this application will be briefly described as follows.

That is, a data processing system according to the present invention includes an interrupt mechanism that incorporates a counter for retaining the number of times of occurrence of an interrupt request generation event.

This counter counts up when a software processing that generates a software interrupt or a hardware event that generates a hardware interrupt occurs, and counts down when a CPU executes a processing for finishing an interrupt exception handling routine (executes processing for removing an interrupt request or a return instruction from an exception processing). Also, when the value of this counter is not zero, an interrupt request signal to the CPU is asserted. That is, it is possible to continuously assert the interrupt request signal until as many count down processings as count up processings are performed.

In this manner, when the same interrupt request generation event occurs a plurality of times, the CPU performs a processing for removing the interrupt request (instruction execution) at the end of a first interrupt exception handling routine. Even after a return instruction from the exception processing is executed and thereby returns to the instruction execution before the interrupt exception handling routine, the CPU starts executing a second interrupt exception handling routine because the interrupt request signal to the CPU is asserted.

It is, therefore, possible to execute the interrupt exception handling routine as many times as the number of times of occurrence of the event that the same interrupt request is generated.

Further, the data processing system according to the present invention includes a function to convert an integer into a floating-point number in a DMAC when transferring data from a peripheral circuit (e.g., AD converter) to a memory.

The effect obtained by the representative one of the inventions disclosed in this application will be briefly described as follows.

Since the counter retains the number of times of occurrence of the same interrupt request generation event and the interrupt request signal is continuously asserted, the CPU can execute the interrupt exception handling routine as many times as the number of times of occurrence of the event.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
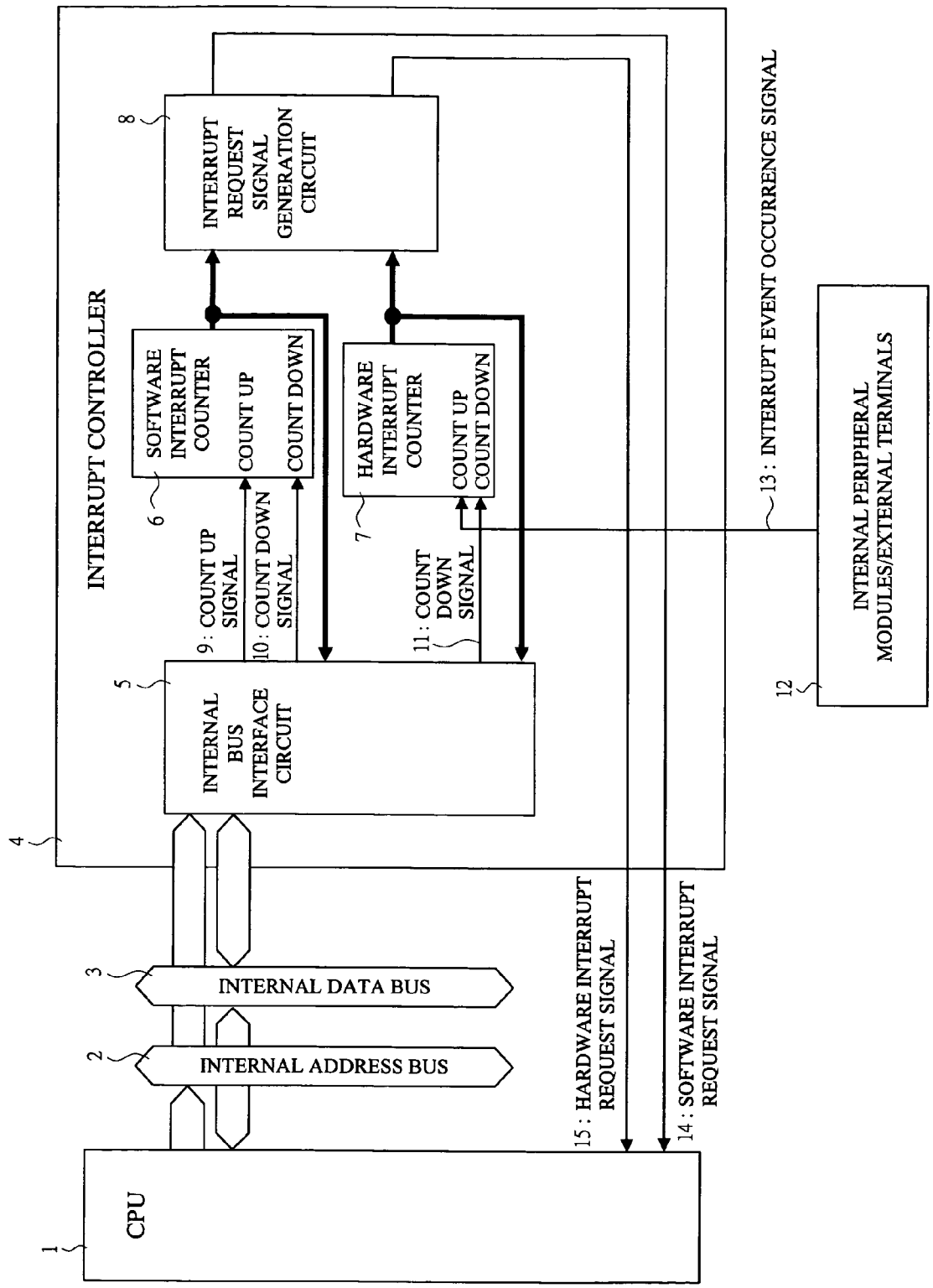
FIG. 1 is a block diagram showing a configuration of a data processing system according to a first embodiment of the present invention.
Figure 2:
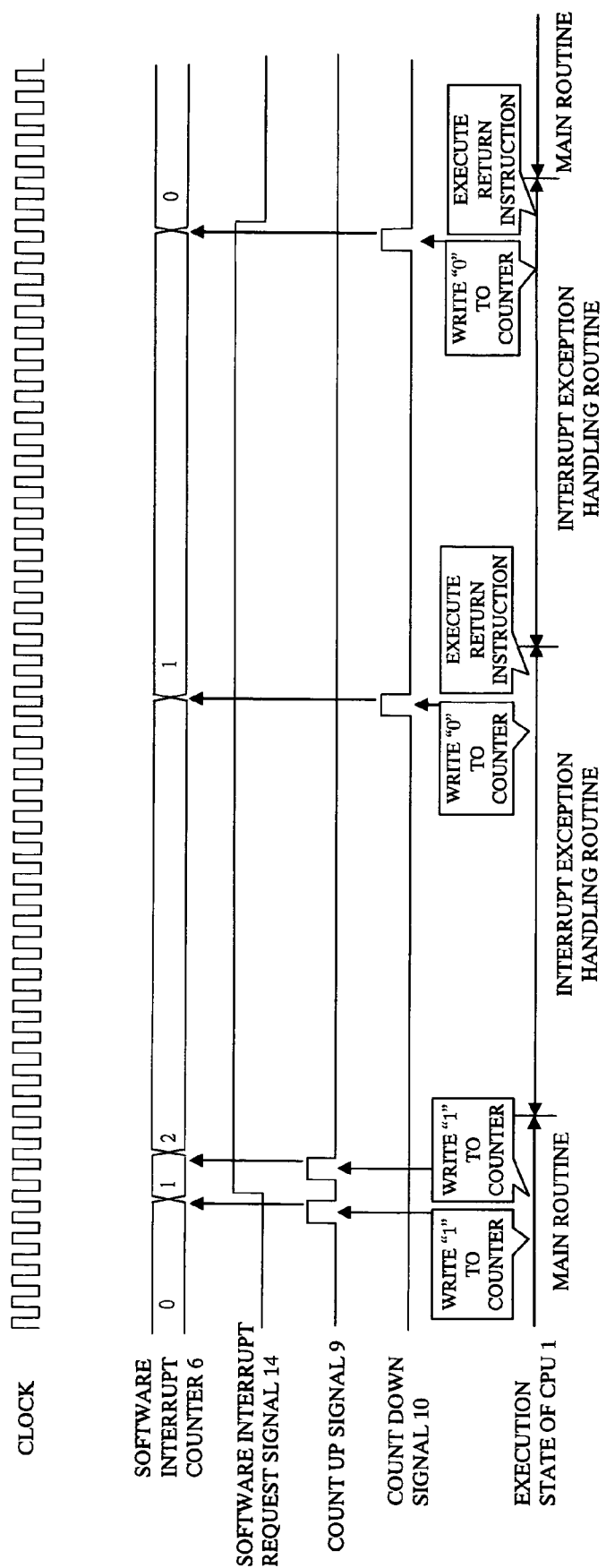
FIG. 2 is a timing chart showing a software interrupt processing in the data processing system according to the first embodiment of the present invention.
Figure 3:
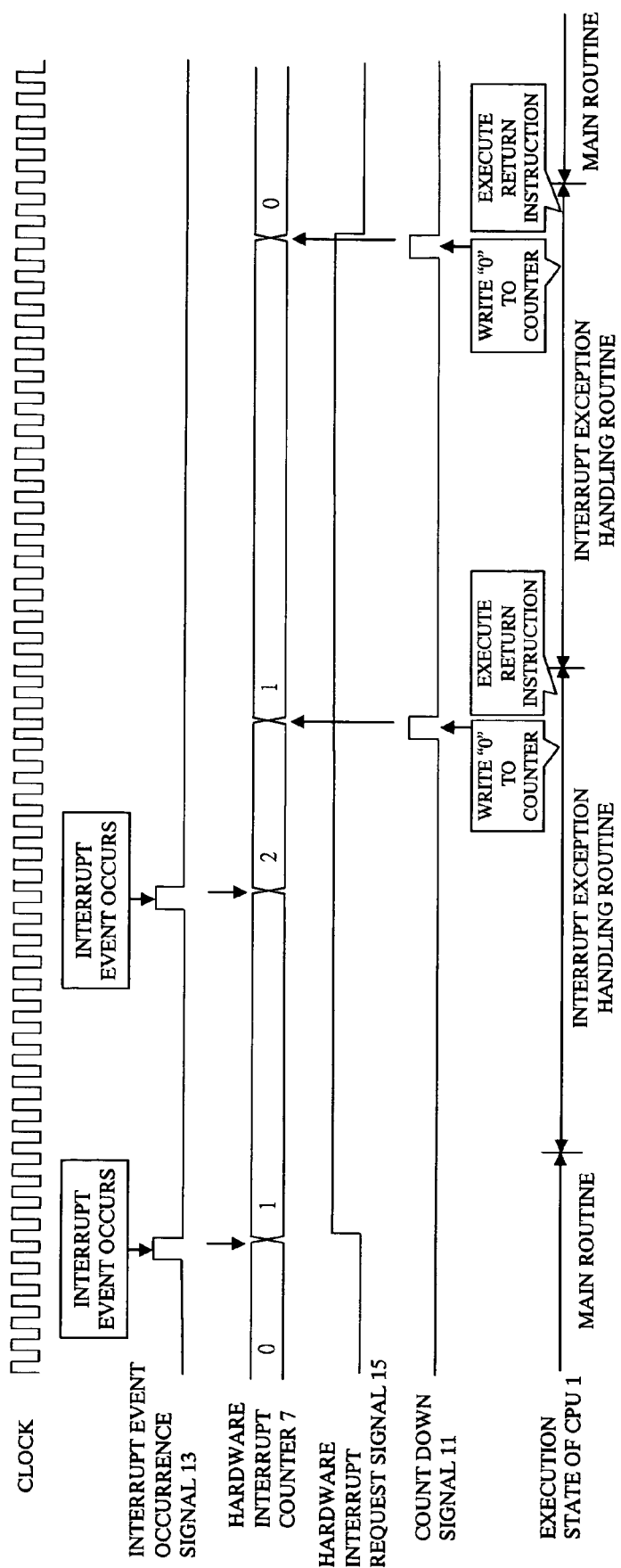
FIG. 3 is a timing chart showing a hardware interrupt processing in the data processing system according to the first embodiment of the present invention.

FIG. 1 is a block diagram showing a configuration of a data processing system according to a first embodiment of the present invention. FIG. 2 is a timing chart showing a software interrupt processing in the data processing system according to the first embodiment. FIG. 3 is a timing chart showing a hardware interrupt processing in the data processing system according to the first embodiment.

With reference to FIG. 1, one example of the configuration of the data processing system according to the first embodiment will first be described. The data processing system according to the first embodiment is, for example, a system such as a microcontroller. The data processing system includes, for example, a CPU 1, an interrupt controller 4, and internal peripheral modules/external terminals 12 composed of an AD converter, a digital-analog converter (hereinafter, "DA converter"), a DMAC, a timer, and a serial USB. The CPU 1 is electrically connected to the interrupt controller 4 by an internal address bus 2 and an internal data bus 3. The data processing system may be constituted of the respective constituent elements formed on one semiconductor substrate. The interrupt controller 4 includes, for example, an internal bus interface circuit 5, a software interrupt counter 6, a hardware interrupt counter 7, and an interrupt request signal generation circuit 8. A count up signal 9 is input from the internal bus interface circuit 5 to a count up input of the software interrupt counter 6. A count down signal 10 is input from the internal bus interface circuit 5 to a count down input of the software interrupt counter 6. A count down signal 11 is input from the internal bus interface circuit 5 to a count down input of the hardware interrupt counter 7. An interrupt event occurrence signal 13 is input from the internal peripheral modules/external terminals 12 to a count up input of the hardware interrupt counter 7. A software interrupt request signal 14 and a hardware interrupt request signal 15 are input from the interrupt request signal generation circuit 8 to the CPU 1. A signal having a width of a plurality of bits (e.g., 8 bits) is input from the software interrupt counter 6 and the hardware interrupt counter 7 to the interrupt request signal generation circuit 8 and the internal bus interface circuit 5. Although only one software interrupt counter 6 and only one hardware interrupt counter 7 are shown in FIG. 1, the number of the software interrupt counters 6 and the number of the hardware interrupt counter 7 are not limited to one, and a plurality of software interrupt counters 6 or hardware interrupt counters 7 are connected in parallel for each of a plurality of interrupt factors. Namely, counters are prepared for each of interrupt factors (each of interrupt types) of the interrupt event occurrence signals (hardware interrupts) and the software processings (software interrupts) that require interrupt processings so as to retain the number of each interrupt. It is thereby possible to utilize the configuration of the data processing system according to the first embodiment for a plurality of interrupt factors.

An operation of the data processing system according to the first embodiment will next be described.

The software interrupt processing (software interrupt exception handling) is performed as follows (see FIG. 2).

First, when the CPU 1 executes a store instruction to an address allocated to the software interrupt counter 6 in the interrupt controller 4, then the address is placed on the internal address bus 2, and write data is placed on the internal data bus 3.

The internal bus interface circuit 5 in the interrupt controller 4 determines that the address on the internal address bus 2 is the address of the software interrupt counter 6. Further, the internal bus interface circuit 5 determines whether the write data on the internal data bus 3 is "1" or "0". If the write data is "1", the count up signal 9 to the software interrupt counter 6 is asserted. If the write data is "0", the count down signal 10 to the software interrupt counter 6 is asserted. The software interrupt counter 6 thereby counts up or counts down.

The interrupt request signal generation circuit 8 in the interrupt controller 4 determines whether the counter value of the software interrupt counter 6 is equal to or larger than "1" or "0". If the counter value is equal to or larger than "1", the software interrupt request signal 14 to the CPU 1 is asserted. If the counter value is "0", the software interrupt request signal 14 to the CPU 1 is negated.

After assertion of the software interrupt request signal 14, the CPU 1 starts executing a software interrupt exception handling routine.

As an interrupt request removal processing before executing a return instruction from the exception processing, in order to finish the software interrupt exception handling routine, the CPU 1 executes a store instruction of write data "0" to the address allocated to the software interrupt counter 6. The software interrupt counter 6 thereby counts down.

The CPU 1 executes the return instruction from the exception processing, thereby withdrawing from the software interrupt exception handling routine.

If the counter value of the software interrupt counter 6 is "0" after the countdown, the software interrupt request signal 14 is negated. If the counter value of the software interrupt counter 6 is equal to or larger than "1" after the countdown, the software interrupt request signal 14 is continuously asserted. The CPU 1, therefore, starts the software interrupt exception handling routine again.

If the CPU 1 executes a load instruction to the address allocated to the software interrupt counter 6, the internal bus interface circuit 5 in the interrupt controller 4 places the counter value itself of the software interrupt counter 6 on the internal data bus 3. The CPU 1 can, therefore, read the counter value.

The hardware interrupt processing (hardware interrupt exception handling) is executed as follows (see FIG. 3).

First, when the CPU 1 executes a store instruction to an address allocated to the hardware interrupt counter 7 in the interrupt controller 4 as an interrupt request removal processing, the address is placed on the internal address bus 2 and write data is placed on the internal data bus 3.

The internal bus interface circuit 5 in the interrupt controller 4 determines that the address on the internal address bus 2 is the address of the hardware interrupt counter 7. In addition, the internal bus interface circuit 5 determines whether the write data on the internal data bus 3 is "0". If the write data is "0", the count down signal 11 to the hardware interrupt counter 7 is asserted. The hardware interrupt counter 7 thereby counts down.

When some event occurs in the internal peripheral modules/external terminals 12, the interrupt event occurrence signal 13 to the interrupt controller 4 is asserted. The hardware interrupt counter 7 thereby counts up.

The interrupt request signal generation circuit 8 in the interrupt controller 4 determines whether the counter value of the hardware interrupt counter 7 is equal to or larger than "1" or "0". If the counter value is equal to or larger than "1", the hardware interrupt request signal 15 to the CPU 1 is asserted. If the counter value is "0", the hardware request signal 15 to the CPU 1 is negated.

After assertion of the hardware interrupt request signal 15, the CPU 1 starts executing a hardware interrupt exception handling routine (software interrupt exception processing routine).

As an interrupt request removal processing before executing a return instruction from the exception processing, in order to finish the hardware interrupt exception handling routine, the CPU 1 executes a store instruction of write data "0" to the address allocated to the hardware interrupt counter 7. The hardware interrupt counter 7 thereby counts down.

The CPU 1 executes the return instruction from the exception processing, thereby withdrawing from the hardware interrupt exception handling routine.

If the counter value of the hardware interrupt counter 7 is "0" after the countdown, the hardware interrupt request signal 15 is negated. If the counter value of the hardware interrupt counter 7 is equal to or larger than "1" after the countdown, the hardware interrupt request signal 15 is continuously asserted. The CPU 1, therefore, starts the hardware interrupt exception handling routine again.

If the CPU 1 executes a load instruction to the address allocated to the hardware interrupt counter 7, the internal bus interface circuit 5 in the interrupt controller 4 places the counter value itself of the hardware interrupt counter 7 on the internal data bus 3. The CPU 1 can, therefore, read the counter value.

When a plurality of interrupt events occur, a control circuit (not shown) in the interrupt controller determines an interrupt processing priority order, and the interrupt request signal is output to the CPU in accordance with the interrupt processing priority order.

As described above, in the data processing system according to the first embodiment, the counters count up as many times as the number of times of occurrence of the same interrupt request generation event, and the interrupt request signal is asserted when the counter value is not "0". Therefore, the data processing system can continuously assert the interrupt request signal until as many count down processings as count up processings are performed.

Further, since the counter retains the number of times of occurrence of the same interrupt request generation event and continuously asserts the interrupt request signal, the CPU 1 can execute the interrupt exception handling routine as many times as the number of times of occurrence of the same interrupt request generation event.

In the case where the same internal module outputs a plurality of different interrupt events to the interrupt controller 4, it is preferable to provide the hardware interrupt counter for each of the interrupt events. It is thereby possible to retain the number of times of occurrence of the same interrupt event for each interrupt event even if the same internal module outputs the different interrupt events.

Second Embodiment

Figure 4:
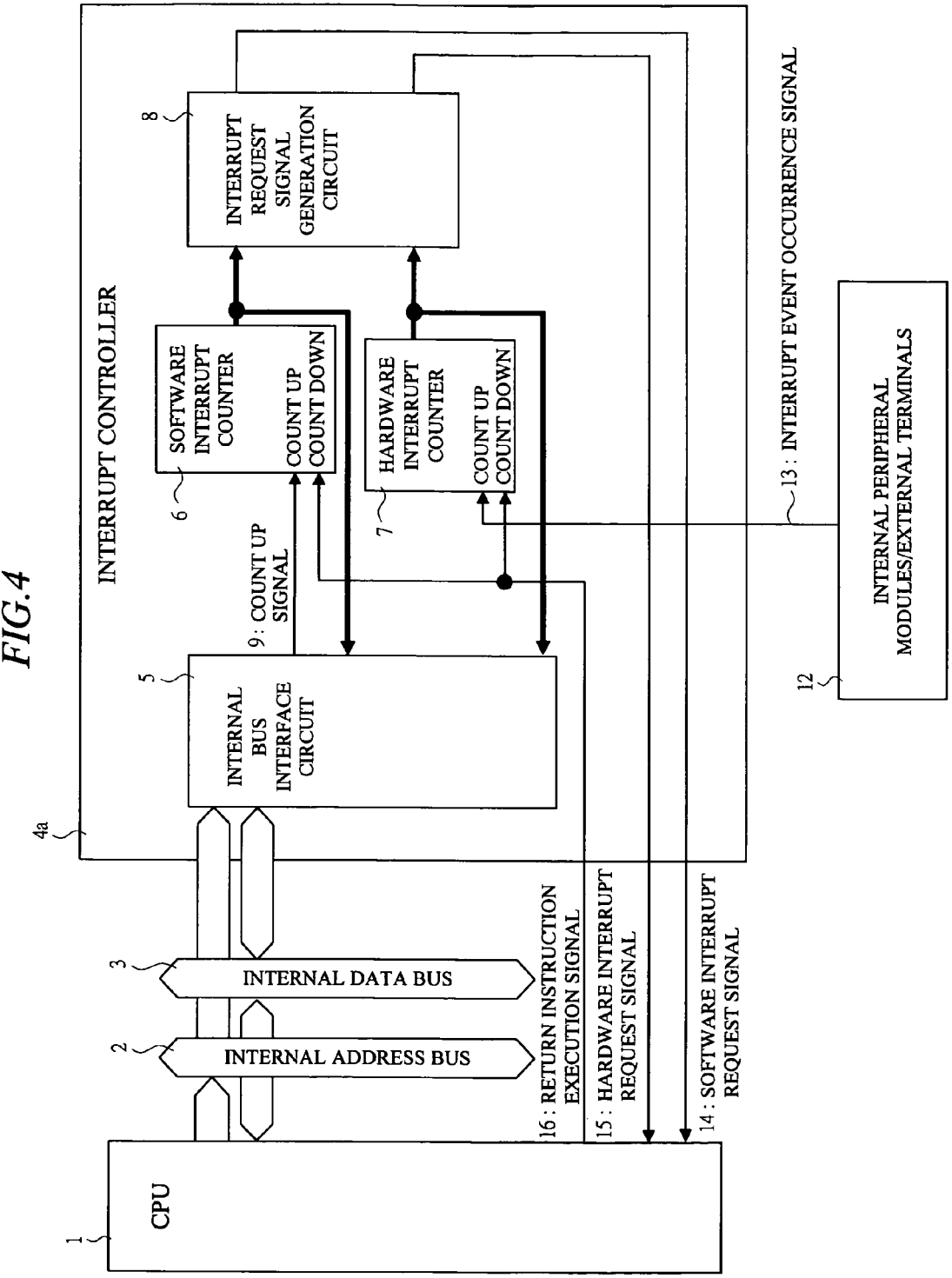
FIG. 4 is a block diagram showing a configuration of a data processing system according to a second embodiment of the present invention.
Figure 5:
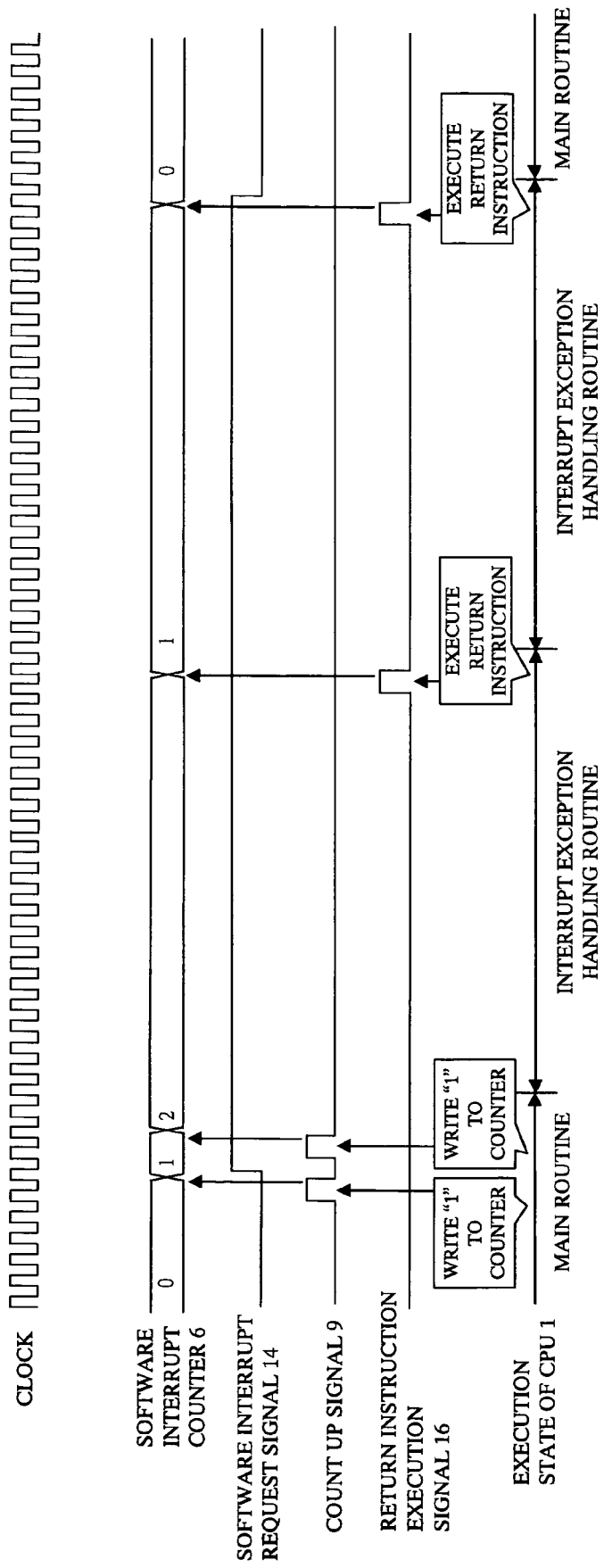
FIG. 5 is a timing chart showing a software interrupt processing in the data processing system according to the second embodiment of the present invention.
Figure 6:
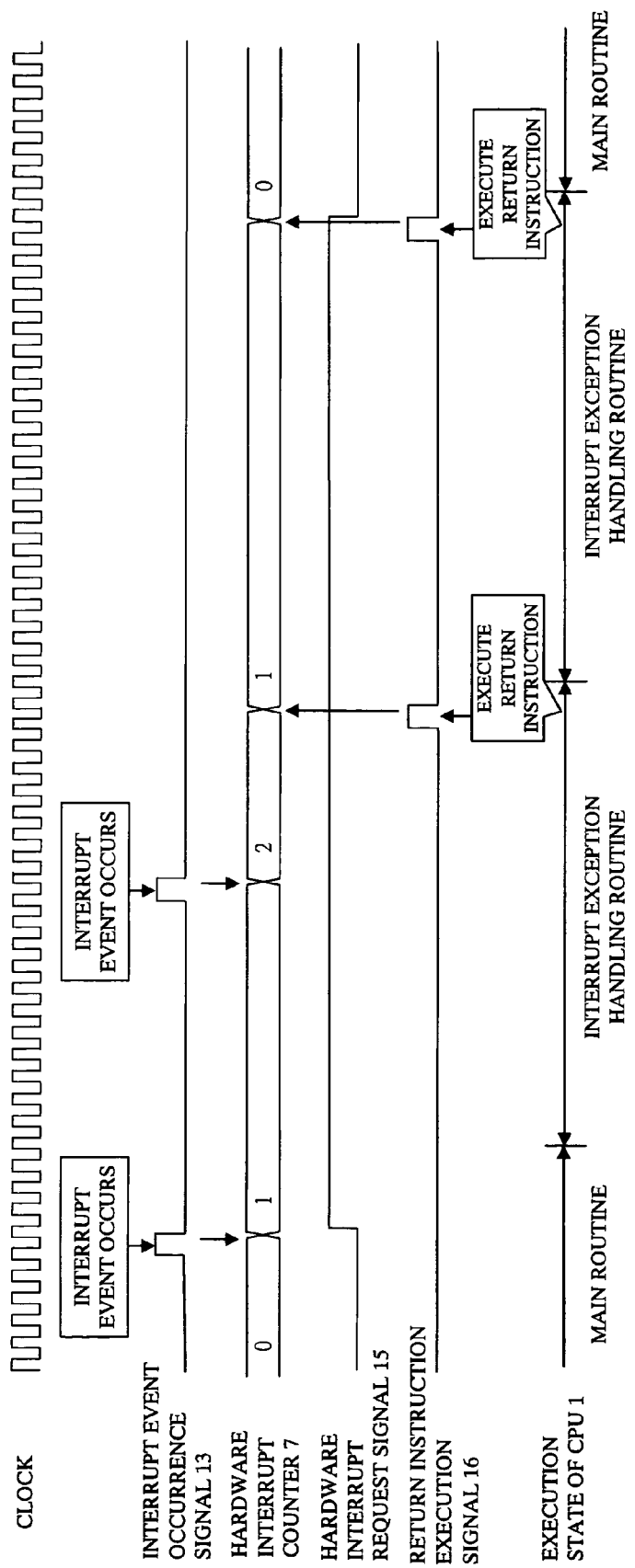
FIG. 6 is a timing chart showing a hardware interrupt processing in the data processing system according to the second embodiment of the present invention.

FIG. 4 is a block diagram showing a configuration of a data processing system according to a second embodiment of the present invention. FIG. 5 is a timing chart showing a software interrupt processing (software interrupt exception handling) in the data processing system according to the second embodiment. FIG. 6 is a timing chart showing a hardware interrupt processing (hardware interrupt exception handling) in the data processing system according to the second embodiment.

With reference to FIG. 4, one example of the configuration of the data processing system according to the second embodiment will first be described. In the data processing system according to the second embodiment, instead of the count down signals 10 and 11 in the data processing system according to the first embodiment, a return instruction execution signal 16 output from an CPU 1 is input to each of the software interrupt counter 6 and the hardware interrupt counter 7, and each counter can count down in response to the return instruction execution signal 16.

An operation of the data processing system according to the second embodiment will next be described.

The software interrupt processing (software interrupt exception handling) is executed as follows (see FIG. 5).

First, when the CPU 1 executes a store instruction to an address allocated to the software interrupt counter 6 in an interrupt controller 4a, then the address is placed on an internal address bus 2, and write data is placed on an internal data bus 3.

An internal bus interface circuit 5 in the interrupt controller 4a determines that the address on the internal address bus 2 is the address of the software interrupt counter 6. Further, the internal bus interface circuit 5 determines whether the write data on the internal data bus 3 is "1" or "0". If the write data is "1", a count up signal 9 to the software interrupt counter 6 is asserted. The software interrupt counter 6 thereby counts up.

An interrupt signal generation circuit 8 in the interrupt controller 4a determines whether the counter value of the software interrupt counter 6 is equal to or larger than "1" or "0". If the counter value is equal to or larger than "1", a software interrupt request signal 14 to the CPU 1 is asserted. If the counter value is "0", the software interrupt request signal 14 to the CPU 1 is negated.

After assertion of the software interrupt request signal 14, the CPU 1 starts executing a software interrupt exception handling routine (software interrupt exception processing routine).

If the CPU 1 executes a return instruction from the exception processing in order to finish the interrupt exception handling routine, the return instruction execution signal 16 from the CPU 1 to the interrupt controller 4a is asserted. The software interrupt counter 6 thereby counts down. In addition, the CPU 1 withdraws from the software interrupt exception handling routine.

If the counter value of the software interrupt counter 6 is "0" after the countdown, the software interrupt request signal 14 is negated. If the counter value of the software interrupt counter 6 is equal to or larger than "1" after the countdown, the software interrupt request signal 14 is continuously asserted. Therefore, the CPU 1 starts the software interrupt exception handling routine again.

If the CPU 1 executes a load instruction to the address allocated to the software interrupt counter 6, the internal bus interface circuit 5 in the interrupt controller 4a places the counter value itself of the software interrupt counter 6 on the internal data bus 3. The CPU 1 can, therefore, read the counter value.

The hardware interrupt processing (hardware interrupt exception processing) is executed as follows (see FIG. 6).

First, when some event occurs in the internal peripheral modules/external terminals 12, an interrupt event occurrence signal 13 to the interrupt controller 4a is asserted. The hardware interrupt counter 7 thereby counts up.

The interrupt request signal generation circuit 8 in the interrupt controller 4a determines whether the counter value of the hardware interrupt counter 7 is equal to or larger than "1" or "0". If the counter value is equal to or larger than "1", a hardware interrupt request signal 15 to the CPU 1 is asserted. If the counter value is "0", the hardware request signal 15 to the CPU 1 is negated.

After assertion of the hardware interrupt request signal 15, the CPU 1 starts executing a hardware interrupt exception handling routine (hardware interrupt exception processing routine).

If the CPU 1 executes a return instruction from the exception processing in order to finish the interrupt exception handling routine, the return instruction execution signal 16 from the CPU 1 to the interrupt controller 4a is asserted, and the hardware interrupt counter 7 counts down. In addition, the CPU 1 withdraws from the hardware interrupt exception handling routine.

If the counter value of the hardware interrupt counter 7 is "0" after the countdown, the hardware interrupt request signal 15 is negated. If the counter value of the hardware interrupt counter 7 is equal to or larger than "1" after the countdown, the hardware interrupt request signal 15 is continuously asserted. Therefore, the CPU 1 starts the hardware interrupt exception handling routine again.

If the CPU 1 executes a load instruction to the address allocated to the hardware interrupt counter 7, the internal bus interface circuit 5 in the interrupt controller 4a places the counter value itself of the hardware interrupt counter 7 on the internal data bus 3. The CPU 1 can, therefore, read the counter value.

As described above, the data processing system according to the second embodiment can achieve the same advantages as those of the data processing system according to the first embodiment.

Third Embodiment

Figure 7:
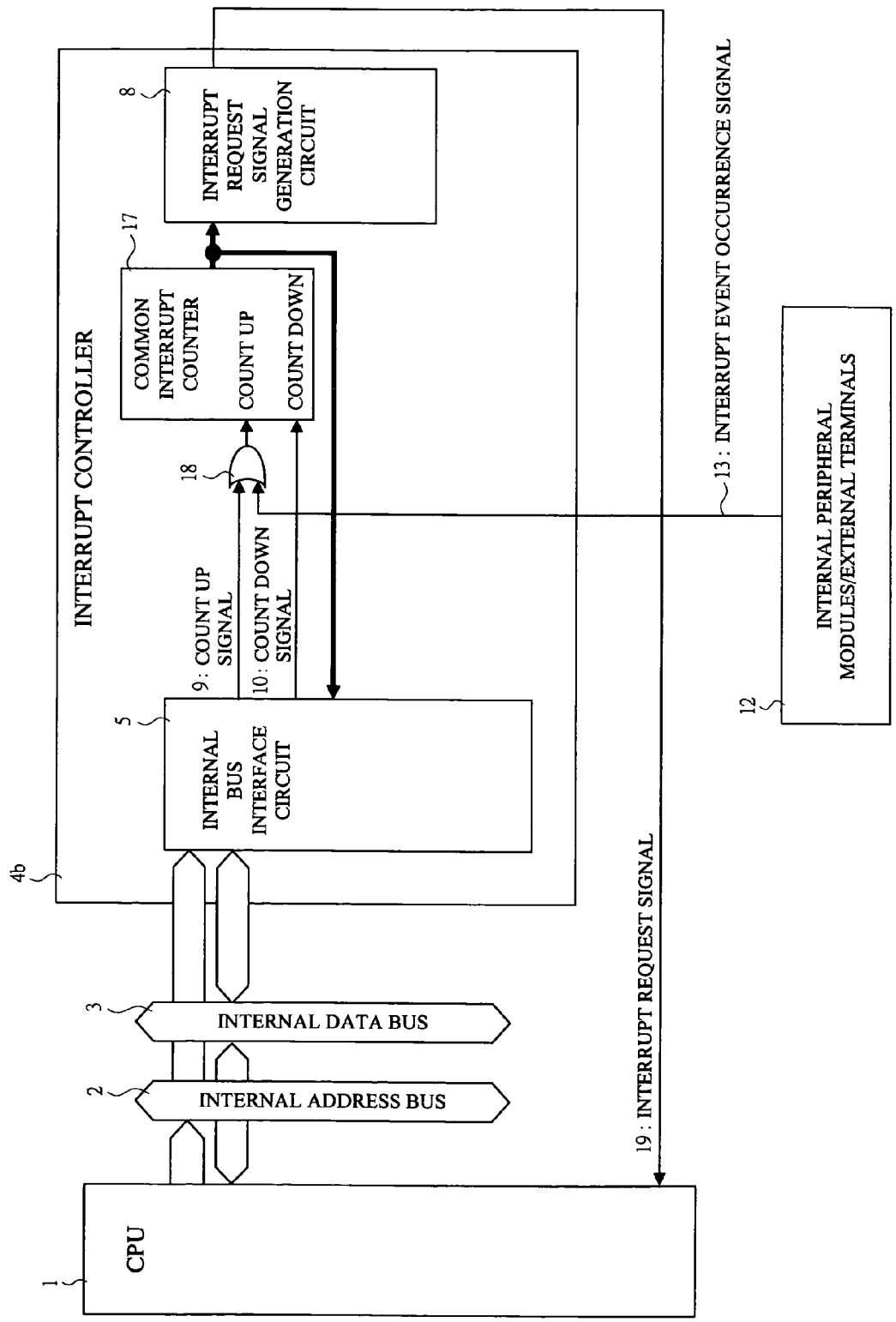
FIG. 7 is a block diagram showing a configuration of a data processing system according to a third embodiment of the present invention.

FIG. 7 is a block diagram showing a configuration of a data processing system according to a third embodiment of the present invention.

In the data processing system according to the third embodiment, an interrupt counter and an interrupt request signal are commonly used for a software interrupt processing (software interrupt exception handling) and a hardware interrupt processing (hardware interrupt exception handling).

Namely, in an interrupt controller 4b of the data processing system, the software interrupt counter 6 and the hardware interrupt counter 7 according to the first embodiment are replaced by a common interrupt counter 17, and an OR gate 18 is provided. In addition, the count up signal 9 from an internal bus interface circuit 5 and an interrupt event occurrence signal 13 from an internal peripheral modules/external terminals 12 are input to the OR gate 18. An output of the OR gate 18 is input to a count up input of the common interrupt counter 17, and a count down signal 10 is input to a count down input of the common interrupt counter 17. Further, the software interrupt request signal 14 and the hardware interrupt request signal 15 are replaced by an interrupt request signal 19 commonly used for the software interrupt processing and the hardware interrupt processing.

In this manner, the common interrupt counter 17 counts up in response to each of the software processing by the CPU 1 and the hardware event by the internal peripheral modules/external terminals 12.

As described above, in the data processing system according to the third embodiment, if the same interrupt exception handling routine is executed for both of the software interrupt and the hardware interrupt, it is possible to reduce a circuit area and simplify a program in comparison to the first and second embodiments.

Fourth Embodiment

Figure 8:
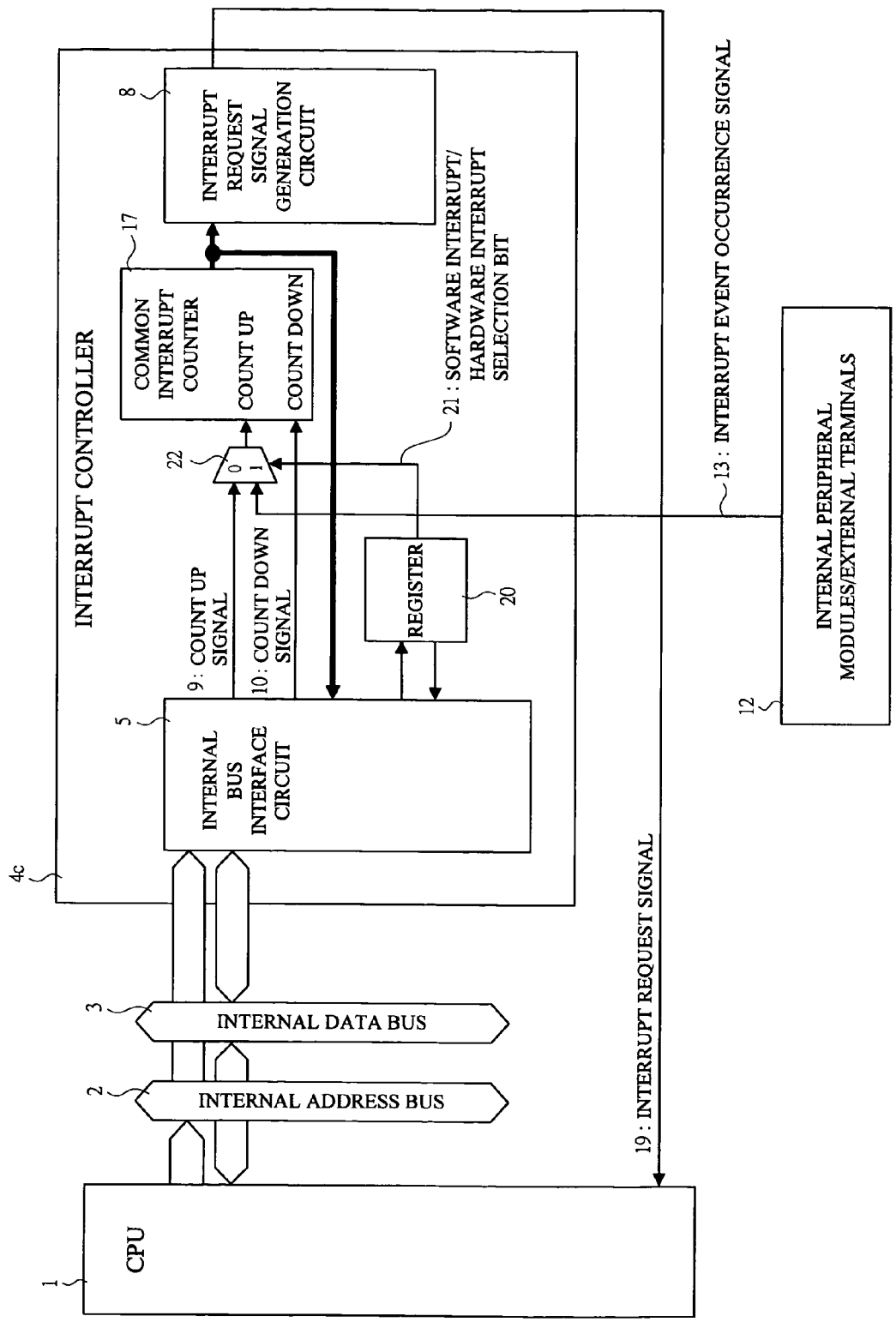
FIG. 8 is a block diagram showing a configuration of a data processing system according to a fourth embodiment of the present invention.

FIG. 8 is a block diagram showing a configuration of a data processing system according to a fourth embodiment of the present invention.

Similar to the third embodiment, in the data processing system according to the fourth embodiment, an interrupt counter and an interrupt request signal are commonly used for a software interrupt processing (software interrupt exception handling) and a hardware interrupt processing (hardware interrupt exception handling).

Namely, an additional register 20 which can read and write data from and to the CPU 1 through an internal address bus 2 and an internal data bus 3 is provided in an interrupt controller 4c of the data processing system. In addition, a bit in the register 20 is set as a software interrupt/hardware interrupt selection bit 21.

In addition, a selector 22 that selects the count up signal 9 from the internal bus interface circuit 5 or the interrupt event occurrence signal 13 from the internal peripheral modules/external terminals 12 in accordance with the software interrupt/hardware interrupt selection bit 21 is provided, and an output signal of the selector 22 is input to a count up input of a common interrupt counter 17. Therefore, the common interrupt counter 17 counts up in response to either a software processing by the CPU 1 or a hardware event by the internal peripheral modules/external terminals 12.

If the counter value of the common interrupt counter 17 is equal to or larger than "1", an interrupt request signal generation circuit 8 asserts only one of the software interrupt request signal and the hardware interrupt request signal to the CPU 1 in accordance with the software interrupt/hardware interrupt selection bit 21.

As described above, in the data processing system according to the fourth embodiment, different interrupt exception handling routines are executed for the software interrupt processing and the hardware interrupt processing, respectively. However, if the software interrupt and the hardware interrupt do not occur simultaneously or if the interrupt processing using the counter is performed for only one of the software interrupt and the hardware interrupt, the data processing system can reduce a circuit area in comparison to the first and second embodiments. It is thereby possible to apply the data processing system with a smaller circuit configuration to a wide range of purposes.

Fifth Embodiment

Figure 9:
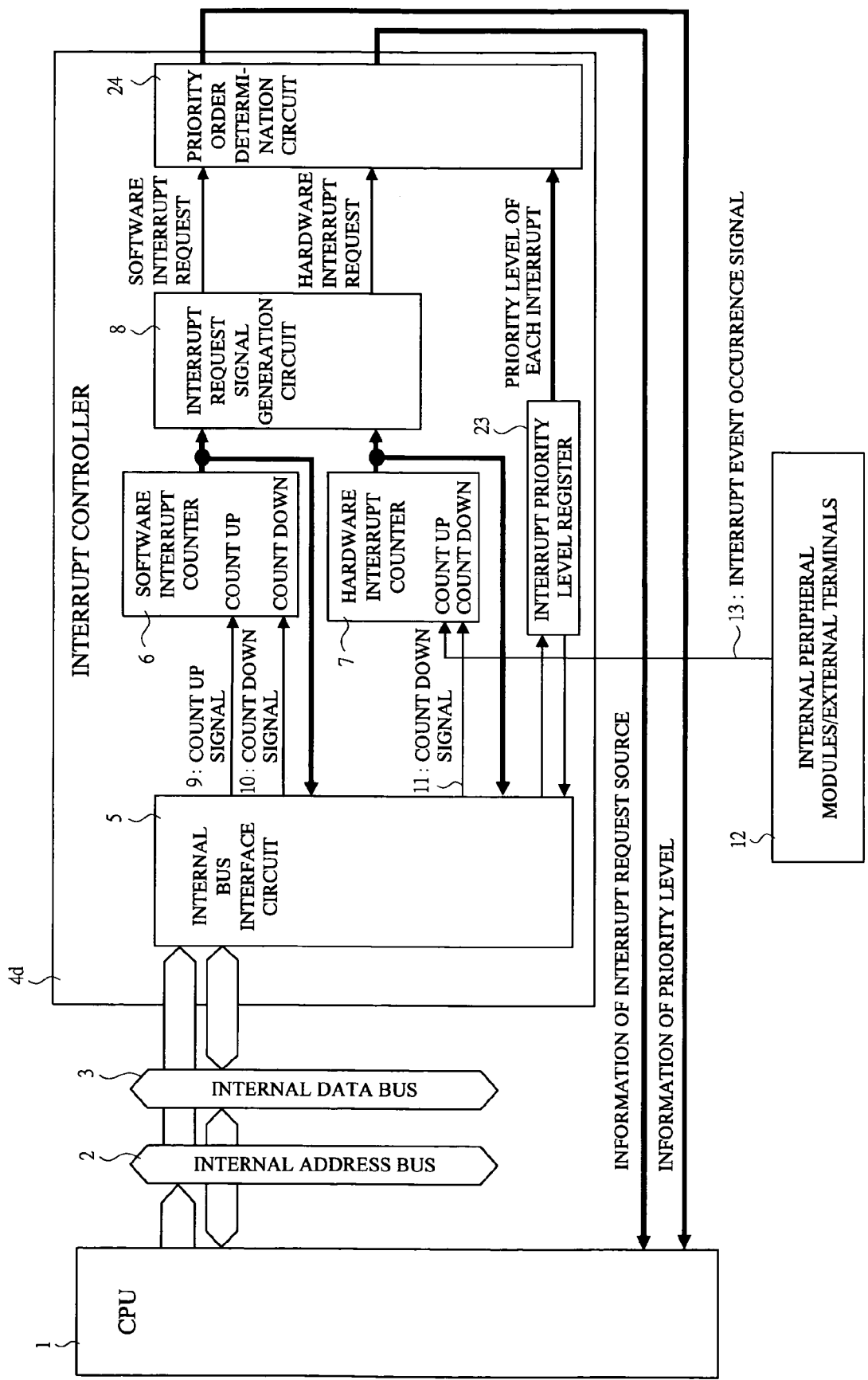
FIG. 9 is a block diagram showing a configuration of a data processing system according to a fifth embodiment of the present invention.

FIG. 9 is a block diagram showing a configuration of a data processing system according to a fifth embodiment of the present invention.

In the data processing system according to the fifth embodiment, an interrupt priority order can be arbitrarily set for each interrupt request.

Namely, an interrupt priority level register 23 which can read and write data from and to a CPU 1 through an internal address bus 2 and an internal data bus 3 is provided in an interrupt controller 4d of the data processing system so as to be able to arbitrarily set the interrupt priority order for each interrupt request.

In the interrupt controller 4d, a priority order determination circuit 24 determines a priority order for each of the generated software interrupt request and hardware interrupt request in accordance with the setting of the interrupt priority level register 23, selects an interrupt request source with the highest priority, and transmits information of the interrupt request source (interrupt request signal described above) to the CPU 1. In addition, the priority order determination circuit 24 also transmits priority level information of the interrupt request source to the CPU 1. In this manner, when the information of the interrupt request source is transmitted to the CPU while the CPU is executing an interrupt processing, it is possible to determine which of the interrupt processing (interrupt exception handling) that is now being executed or a newly transmitted interrupt request has a higher priority, and the CPU 1 can perform the processing with higher priority first.

As described above, in the data processing system according to the fifth embodiment, a more flexible control can be achieved in the case where a plurality of types of interrupts are generated simultaneously, and a priority order is to be dynamically changed depending on the cases.

(Specific Example of Interrupt Processing)

Figure 10:
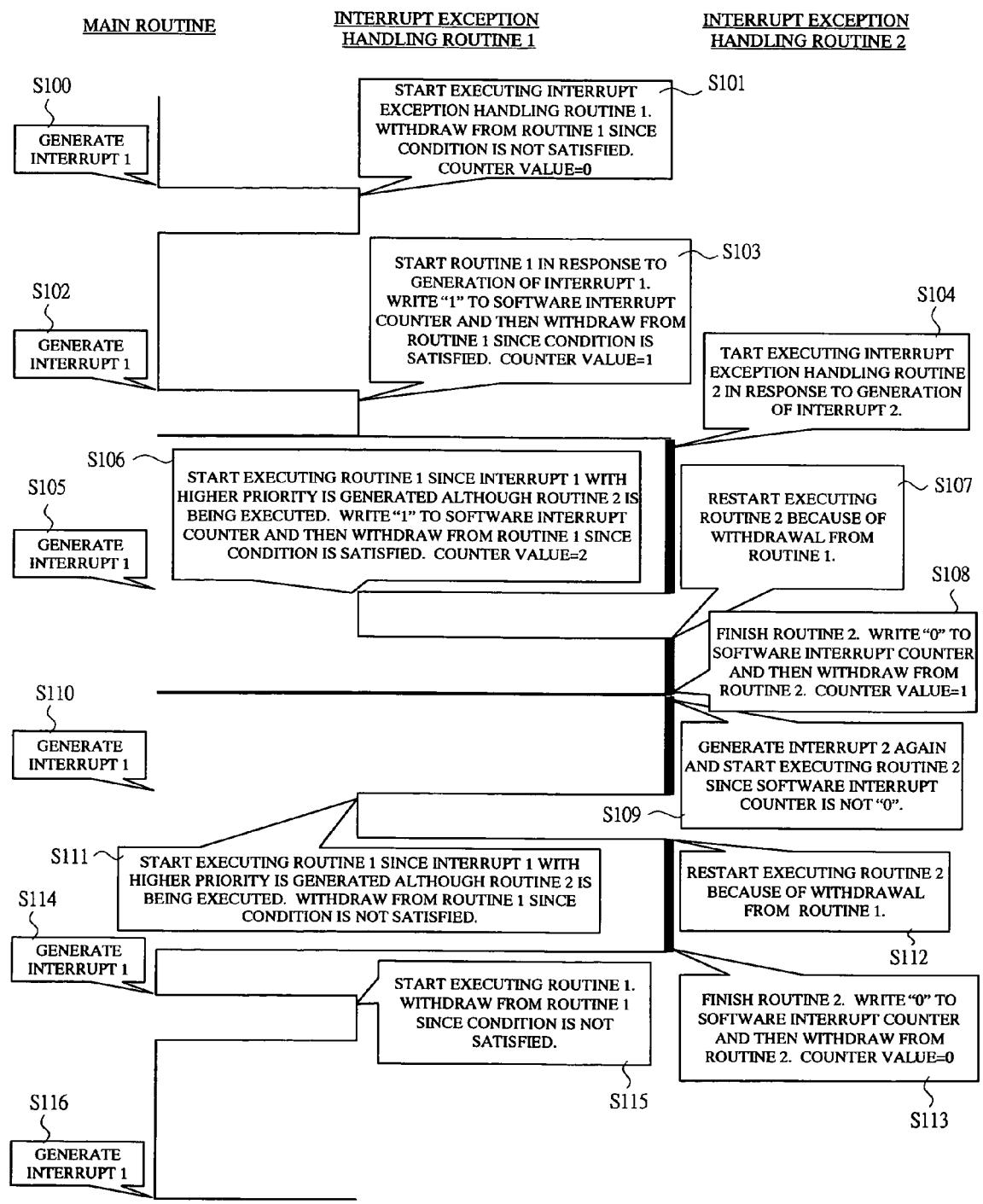
FIG. 10 is a diagram showing an example of a CPU execution state and an interrupt processing flow in the data processing systems according to the first to fifth embodiments of the present invention.

FIG. 10 is a diagram showing an example of a CPU execution state and an interrupt processing (interrupt exception handling) flow in the data processing systems according to the first to fifth embodiments of the present invention.

With reference to FIG. 10, an interrupt exception handling routine 1 (Routine 1) is a routine executed when an interrupt 1 with higher priority than an interrupt 2 is generated. It is assumed herein that the interrupt 1 is regularly generated. A status is monitored during an interrupt exception handling. If a certain condition is satisfied, "1" is written to the software interrupt counter corresponding to the interrupt 2 so as to generate the interrupt 2. For example, in the case of a microcontroller employed for an automobile power train control or the like, the microcontroller monitors whether an accelerator is pressed on, and if the accelerator is pressed on, a gasoline injection processing is executed.

Also, an interrupt exception handling routine 2 (Routine 2) is a routine executed when the interrupt 2 with lower priority than the interrupt 1 is generated. The interrupt 2 is generated during the interrupt exception handling routine 1 and is a software interrupt using the software interrupt counter. If a condition is satisfied during execution of the interrupt exception handling routine 1, "1" is written to the software interrupt counter 6. After performing the interrupt exception handling routine 2, "0" is written to the software interrupt counter 6 corresponding to the interrupt 2. The interrupt exception handling routine 2 is, for example, a processing routine for actually executing the gasoline injection. The routine 2 requires lots of time to calculate an injection quantity.

First, when the interrupt 1 is generated during execution of a main routine (step S100), the CPU 1 starts executing the interrupt exception handling routine 1 (step S101). If a condition is not satisfied, the CPU 1 withdraws from the interrupt exception handling routine 1 (finishes the interrupt exception handling routine 1) and returns to the main routine. At this time, the counter value of the software interrupt counter is "0".

When the interrupt 1 is generated again during execution of the main routine (step S102), the CPU 1 starts executing the interrupt exception handling routine 1 (step S103). If a condition is satisfied, the CPU 1 writes "1" to the software interrupt counter 6 and then withdraws from the interrupt exception handling routine 1. At this time, the counter value of the software interrupt counter 6 is "1".

When the interrupt 2 is generated after the CPU 1 writes "1" to the software interrupt counter 6 or finishes the interrupt exception handling routine 1 for the interrupt 1, the CPU 1 starts executing the interrupt exception handling routine 2 (step S104). It is assumed herein that the interrupt 1 is generated during execution of the interrupt exception handling routine 2 (step S105).

Although the CPU 1 is executing the interrupt exception handling routine 2, the CPU 1 starts executing the interrupt exception handling routine 1 since the interrupt 1 with higher priority than the interrupt 2 is generated (step S106). If a condition is satisfied, the CPU 1 writes "1" to the software interrupt counter 6 and then withdraws from the routine 1. At this time, the counter value of the software interrupt counter corresponding to the interrupt exception handling routine 2 is "2".

Because of withdrawal from the interrupt exception handling routine 1, the CPU 1 restarts executing the interrupt exception handling routine 2 (step S107).

When the CPU 1 finishes the interrupt exception handling routine 2 and writes "0" to the software interrupt counter 6, the CPU 1 withdraws from the routine 2 (step S108). At this time, the counter value of the software interrupt counter is "1". Since the counter value is not "0", the interrupt 2 is generated again and the CPU 1 starts executing the interrupt exception handling routine 2 (step 109). It is assumed that the interrupt 1 is generated during execution of the interrupt exception handling routine 2 (step S110).

Although the CPU 1 is executing the interrupt exception handling routine 2, the CPU 1 starts executing the interrupt exception handling routine 1 since the interrupt 1 with higher priority than the interrupt 2 is generated (step S111). If a condition is not satisfied, the CPU 1 withdraws from the routine 1.

Because of withdrawal from the interrupt exception handling routine 1, the CPU 1 restarts executing the interrupt exception handling routine 2 (step S112).

After the CPU 1 finishes the interrupt exception handling routine 2 and writes "0" to the software interrupt counter 6, the CPU 1 withdraws from the routine 2 (step S113). At this time, the counter value is "0".

When the interrupt 1 is generated during execution of the main routine (step S114), the CPU 1 starts executing the interrupt exception handling routine 1 (step S115). If a condition is not satisfied, the CPU 1 withdraws from the routine 1 and returns to the main routine. Thereafter, similarly to the above steps, the interrupt 1 is generated during execution of the main routine (step S116).

Sixth Embodiment

Figure 11:
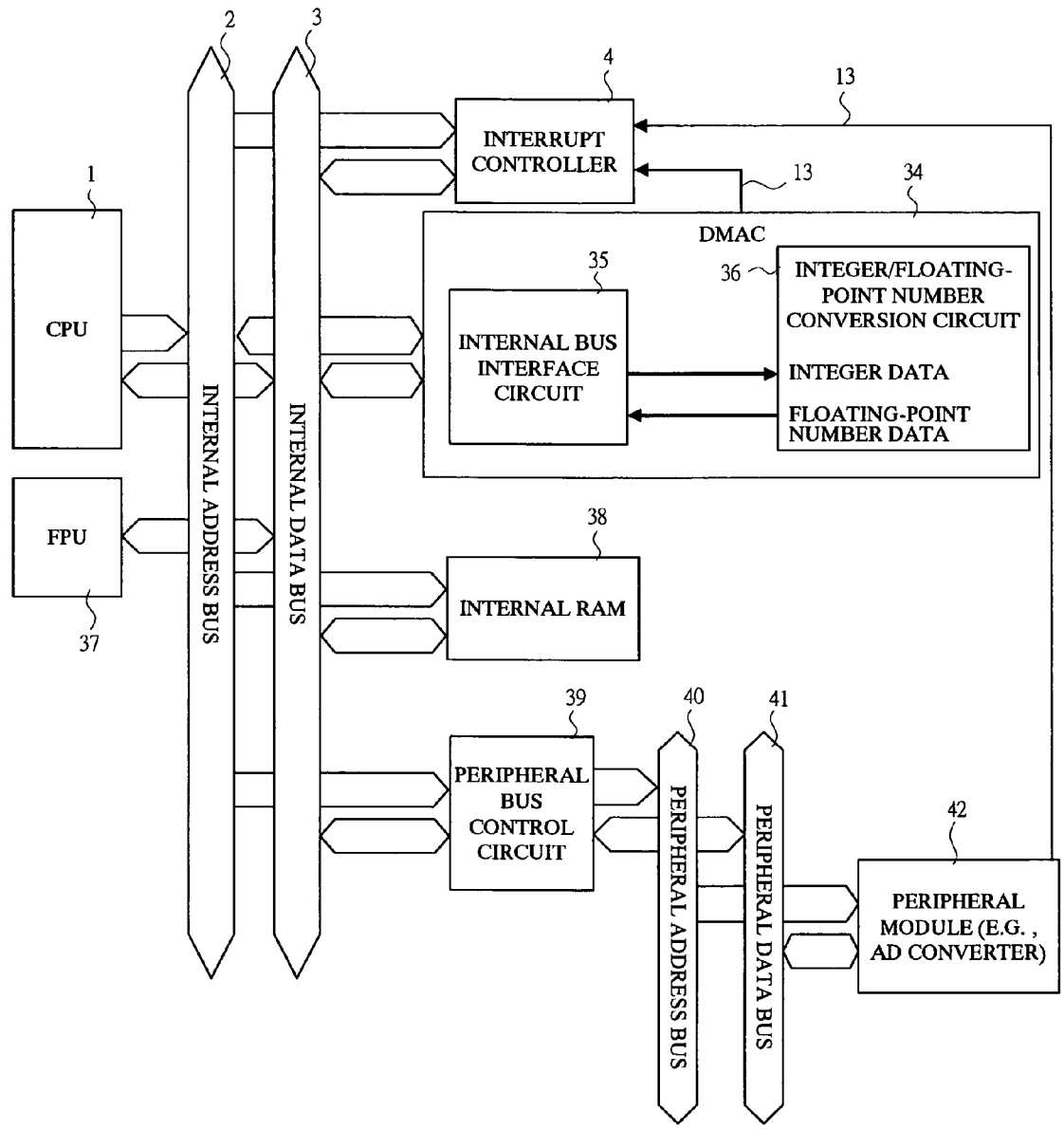
FIG. 11 is a block diagram showing a configuration of a data processing system according to a sixth embodiment of the present invention.

FIG. 11 is a block diagram showing a configuration of a data processing system according to a sixth embodiment of the present invention.

With reference to FIG. 11, one example of the configuration of the data processing system according to the sixth embodiment will first be described. The data processing system according to the sixth embodiment employs a peripheral module 42 such as an AD converter and a DMAC 34 as the internal peripheral modules/external terminals 12 according to the first to fifth embodiments. In addition, an interrupt event occurrence signal 13 is input from the peripheral module 42 and the DMAC 34 to a hardware interrupt counter 7 in an interrupt controller 4. Specifically, even in the case where a plurality of interrupt requests are generated from a certain request source, that is, a plurality of pieces of data are successively fetched to generate a plurality of hardware interrupt request when a hardware interrupt is generated (the interrupt event occurrence signal 13 is output) at each data transfer from the AD converter using the DMAC 34 and simultaneously a processing with higher priority (e.g., CPU processing) is present, and even in the case where the same hardware interrupt request is generated while a hardware interrupt processing (hardware interrupt exception handling) is being performed due to the long processing time of the hardware interrupt processing, as many interrupt processings as interrupt requests can be executed by adopting the configuration according to the sixth embodiment.

The data processing system according to the sixth embodiment includes, for example, the CPU 1, the interrupt controller 4, the DMAC 34, an FPU 37, an internal RAM 38, a peripheral bus control circuit 39, and a peripheral module 42 such as the AD converter. The CPU 1, the interrupt controller 4, the DMAC 34, the FPU 37, the internal RAM 38, and the peripheral bus control circuit 39 are electrically connected to one another by an internal address bus 2 and an internal data bus 3. The peripheral bus control circuit 39 is electrically connected to the peripheral module 42 by a peripheral address bus 40 and a peripheral data bus 41.

The DMAC 34 includes, for example, an internal bus interface circuit 35, an integer/floating-point number conversion circuit 36, and a control circuit (not shown) that sets transfer information and actually controls a transfer operation. The internal bus interface circuit 35 is connected to the integer/floating-point number conversion circuit 36 so as to transmit integer data and floating-point number data. Further, the interrupt event occurrence signal 13 is input from the peripheral module 42 to the interrupt controller 4.

An operation of the data processing system according to the sixth embodiment will next be described.

A transfer starting condition, a transfer source address, and a transfer destination address are set to the DMAC 34. It is assumed herein that an address allocated to the peripheral module (e.g., the AD converter) 42 is the transfer source address, and an address allocated to the internal RAM 38 is the transfer destination address.

If the transfer start condition set in the DMAC 34 is satisfied, the DMAC 34 places the set transfer source address on the internal address bus 2 so as to read data at the set transfer source address.

The peripheral bus control circuit 39 places the address, which has been placed on the internal address bus 2, on the peripheral address bus 40.

The peripheral module 42 places data at the allocated address on the peripheral data bus 41.

The peripheral bus control circuit 39 places the data, which has been placed on the peripheral data bus 41, on the internal data bus 3.

The internal bus interface circuit 35 in the DMAC 34 fetches the data placed on the internal data bus 3, and transmits the data to the integer/floating-point number conversion circuit 36 in the DMAC 34. The integer/floating-point number conversion circuit 36 converts the received data in an integer format into data in a floating-point number format, and transmits the converted data to the internal bus interface circuit 35.

The internal bus interface circuit 35 places the transfer destination address on the internal address bus 2 and places the data converted into the floating-point number format on the internal data bus 3.

The internal RAM 38 writes the data placed on the internal data bus 3 to the address placed on the internal address bus 2.

The CPU 1 or the FPU 37 places the transfer destination address on the internal address bus 2 when reading the data transferred by the DMAC 34.

The internal RAM 38 places the data, which has been written to the address placed on the internal address bus 2, on the internal data bus 3.

The CPU 1 or the FPU 37 acquires data by fetching the data placed on the internal data bus 3.

As described above, in the data processing system according to the sixth embodiment, since the function to convert the data in the integer format into the data in the floating-point number format is provided in the DMAC 34, the data transferred by the DMAC 34 can be acquired as floating-point numbers.

Furthermore, it is unnecessary for the CPU 1 or the FPU 37 to convert the data in the integer format into the data in the floating-point number format, and thus, the system throughput is improved.

Seventh Embodiment

Figure 12:
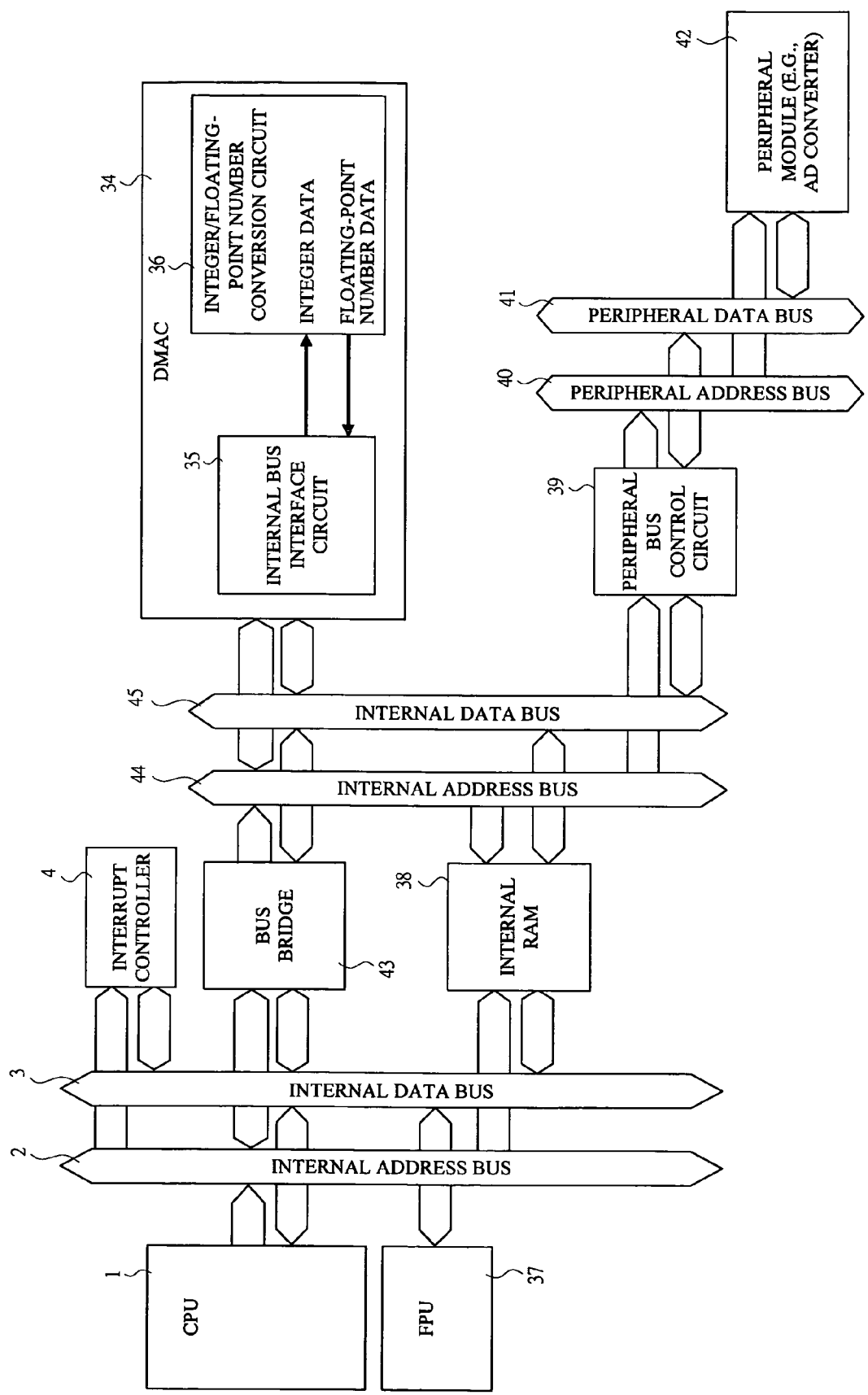
FIG. 12 is a block diagram showing a configuration of a data processing system according to a seventh embodiment of the present invention.

FIG. 12 is a block diagram showing a configuration of a data processing system according to a seventh embodiment of the present invention.

In the data processing system according to the seventh embodiment, the internal address bus 2 and the internal data bus 3 in the data processing system according to the sixth embodiment are divided, and the internal address bus 2 and the internal data bus 3 are connected to another internal address bus 44 and another internal data bus 45 through a bus bridge 43.

A CPU 1 and an FPU 37 are connected to the internal address bus 2 and the internal data bus 3.

An internal RAM 38 is connected to both pairs of the internal address bus 2 and the internal data bus 3 and the internal address bus 44 and the internal data bus 45. The internal RAM 38 is, therefore, accessible from both pairs.

A DMAC 34 is connected to the internal address bus 44 and the internal data bus 45 and employs these buses when transferring data from a transfer source to a transfer destination.

As described above, in the data processing system according to the seventh embodiment, the CPU 1 can employ the internal address bus 2 and the internal data bus 3 even while the DMAC 34 is transferring data. Therefore, the CPU 1 can execute a instruction on the internal RAM 38 without intermission by the DMAC 34, thereby improving the system throughput.

Eighth Embodiment

Figure 13:
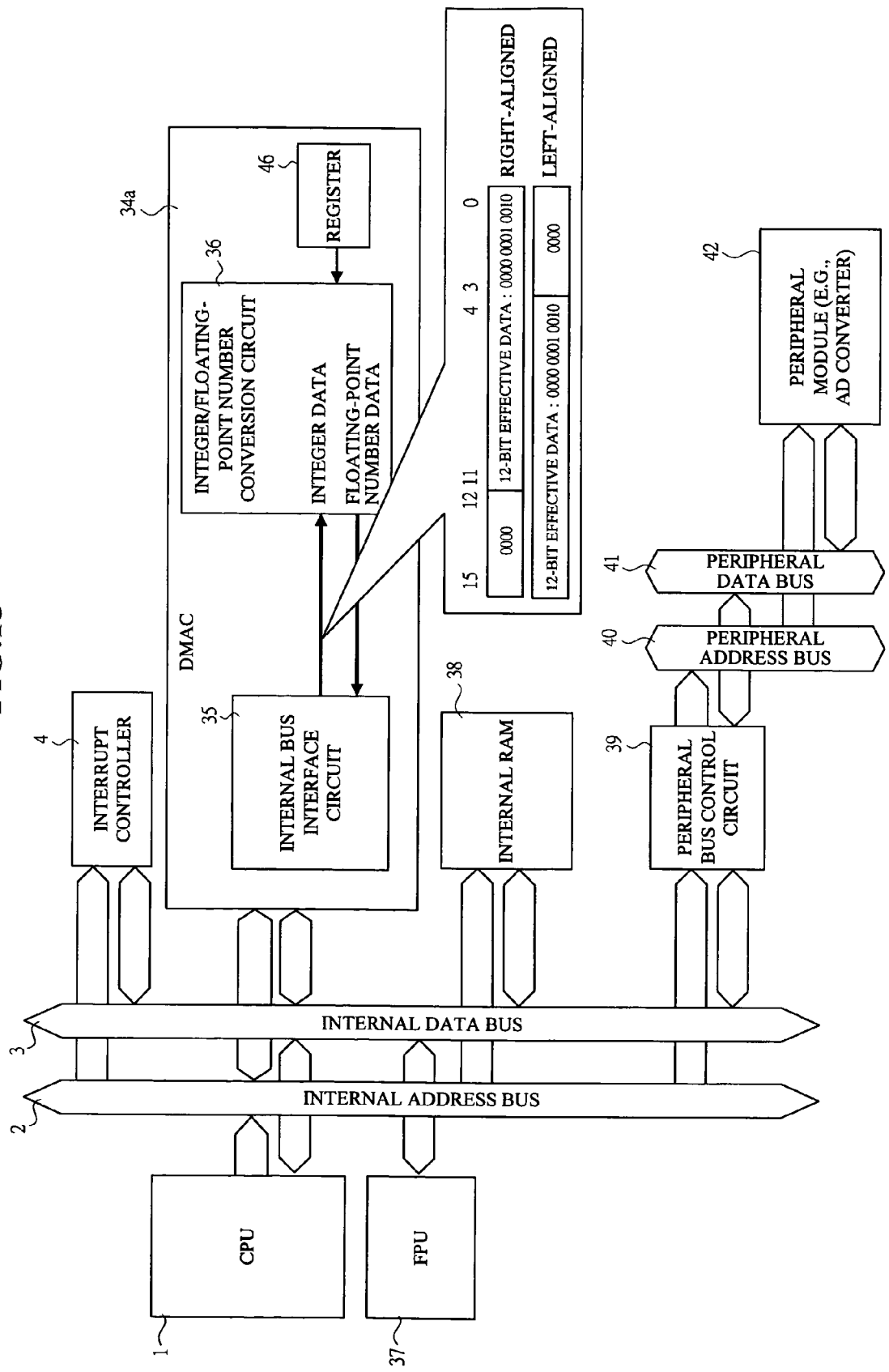
FIG. 13 is a block diagram showing a configuration of a data processing system according to an eighth embodiment of the present invention.

FIG. 13 is a block diagram showing a configuration of a data processing system according to an eighth embodiment of the present invention.

In the data processing system according to the eighth embodiment, a register 46 is provided in the DMAC 34 according to the sixth embodiment, and the register 46 can selectively determine which part of data read from a transfer source is used.

If a peripheral module 42 (e.g., an AD converter) has a resolution of, for example, 12 bits, data converted from analog to digital data is data of 12 bits. Meanwhile, the internal buses and peripheral buses are constituted by an nth power of 2 bits such as 32 bits, 16 bits, or 8 bits. Therefore, in the case where data of 16 bits is to be read when the digitally converted data is, for example, an integer 12'h012, data of 16'h0120 can be read if the AD converter is designed to have left-aligned data, and data of 16'h0012 can be read if the AD converter is designed to have right-aligned data. It is noted that "12'h" represents 12 bits in hexadecimal notation, and that "16'h" represents 16 bits in hexadecimal notation.

To deal with the above-stated cases, the register 46 of 1 bit is provided in the DMAC 34. An integer/floating-point number conversion circuit 36 determines which of left-aligned data or right-aligned data in the data transferred from the transfer source is more effective based on a register value of the register 46.

As described above, the data processing system according to the eighth embodiment can be applied regardless of whether the data read from the transfer source is left-aligned data or right-aligned data. A versatility of an interface of the data processing system with the peripheral module is thereby improved.

In the foregoing, the invention made by the inventors of the present invention has been concretely described based on the embodiments. However, it is needless to say that the present invention is not limited to the foregoing embodiments and various modifications and alterations can be made within the scope of the present invention.

As stated so far in detail, the invention disclosed in the present application is applicable to a data processing system such as a microcomputer. In particular, the present invention is optimally applicable to a high-speed microcomputer product used for the real-time control, a microcomputer product used for automobile control or motor control, or any microcomputer system using interrupts.

What is claimed is:

1. A data processing system comprising:
    a central processing unit (CPU) which executes an interrupt exception processing each time the CPU receives an interrupt request signal, said interrupt exception processing executing another task while;
    a counter which retains a counter value which is a difference between a number of times of occurrence of interrupt request events and a number of times of execution of said interrupt exception processing obtained by counting up the counter value by one at each occurrence of said interrupt request events, and counting down the counter value by one at each execution of said interrupt exception processing; and
    an interrupt controller which immediately handles each and every interrupt request event by generating an interrupt request signal, determines a possible counter value if counting down the counter value by one, and then
    (1) outputs the interrupt request signal to said CPU if the possible counter value is 1 or more, and then immediately makes the CPU execute said interrupt exception processing, and
    (2) negates the interrupt request signal to the CPU if the possible counter value is 0 in order to avoid actually counting down the counter value to become 0.

2. The data processing system according to claim 1, wherein said interrupt request events include a software processing which generates a software interrupt or a hardware event which generates a hardware interrupt.

3. The data processing system according to claim 1, further comprising:
    a plurality of said counters for each of a plurality of interrupt factors.

4. The data processing system according to claim 1, further comprising:
    an interrupt priority level register which can write data from said central processing unit, and can set an interrupt priority order for each interrupt request; and
    a circuit which determines the priority order based on information of said interrupt priority level counter, and transmits information of an interrupt request source with a highest priority to said central processing unit.

5. The data processing system according to claim 1, further comprising:
    a data transfer unit which includes a conversion circuit for converting an integer into a floating-point number,
    wherein said data transfer unit converts the integer into the floating-point number by using said conversion circuit when transferring data from a peripheral circuit to a memory.

6. The data processing system according to claim 1, wherein said interrupt exception processing comprises either a processing for removing an interrupt request or a return instruction from the interrupt exception processing.

7. The data processing system according to claim 6, wherein said processing for removing the interrupt request comprises cleaning an interrupt request flag present in the interrupt controller and then deactivating the interrupt request signal from the interrupt controller to the CPU, after executing the interrupt exception processing.

8. The data processing system according to claim 2, further comprising:
    a register which can write data from said central processing unit, and includes a software interrupt/hardware interrupt selection bit,
    wherein said counter counts up based on information on said selection bit.

9. The data processing system according to claim 5, wherein said peripheral circuit is an analog-digital converter.

10. The data processing system according to claim 5, wherein said data transfer unit transfers the data in accordance with a hardware interrupt from said peripheral circuit.

11. The data processing system according to claim 5, wherein said each interrupt exception processing is either a processing for removing an interrupt request or a return instruction from the interrupt exception processing,
    said processing for removing the interrupt request comprises clearing an interrupt request flag present in the interrupt controller and then deactivating the interrupt request signal from the interrupt controller to the CPU, after executing the interrupt exception processing, and
    said return instruction from the interrupt exception processing comprises returning back to executing said pending task without executing the interrupt exception processing.

12. The data processing system according to claim 7, wherein said return instruction from the interrupt exception processing comprises returning back to executing said pending task without executing the interrupt exception processing.

13. A data processing system comprising:
    a central processing unit (CPU) which executes an interrupt exception processing each time the CPU receives an interrupt request signal, said interrupt exception processing executing another task while executing a pending task;
    a counter which retains a counter value which is a difference between a number of times of occurrence of interrupt request events and a number of times of execution of said interrupt exception processing obtained by counting up the counter value by one at each occurrence of said interrupt request events, and counting down the counter value by one at each execution of said interrupt exception processing; and
    an interrupt controller which immediately handles each and every interrupt request event by generating an interrupt request signal, and then
    (1) outputs the interrupt request signal to said CPU if the counter value is 1 or more, and then immediately makes the CPU execute said interrupt exception processing, and
    (2) negates the interrupt request signal to the CPU if the counter value is 0.

14. The data processing system according to claim 13, wherein said interrupt exception processing comprises either a processing for removing an interrupt request or a return instruction from the interrupt exception processing.

15. The data processing system according to claim 14, wherein said processing for removing the interrupt request comprises cleaning an interrupt request flag present in the interrupt controller and then deactivating the interrupt request signal from the interrupt controller to the CPU, after executing the interrupt exception processing.

16. The data processing system according to claim 15, wherein said return instruction from the interrupt exception processing comprises returning back to executing said pending task without executing the interrupt exception processing.

* * * * *